United States Patent
James

(10) Patent No.: US 10,077,739 B2
(45) Date of Patent: Sep. 18, 2018

(54) DUAL ACTUATION SYSTEM FOR CASCADE AND THRUST REVERSER PANEL FOR AN INTEGRAL CASCADE VARIABLE AREA FAN NOZZLE

(71) Applicant: ROHR, INC., Chula Vista, CA (US)

(72) Inventor: Norman J. James, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 908 days.

(21) Appl. No.: 14/261,279

(22) Filed: Apr. 24, 2014

(65) Prior Publication Data

US 2015/0308379 A1    Oct. 29, 2015

(51) Int. Cl.
| | |
|---|---|
| F02K 1/70 | (2006.01) |
| F02K 1/72 | (2006.01) |
| F02K 1/76 | (2006.01) |
| F02K 1/30 | (2006.01) |
| F02K 1/32 | (2006.01) |

(52) U.S. Cl.
CPC ............... *F02K 1/72* (2013.01); *F02K 1/763* (2013.01); *F02K 1/30* (2013.01); *F02K 1/32* (2013.01); *F02K 1/70* (2013.01); *F02K 1/76* (2013.01); *F02K 1/766* (2013.01)

(58) Field of Classification Search
CPC ..... F02K 1/06; F02K 1/30; F02K 1/32; F02K 1/70; F02K 1/72; F02K 1/76; F02K 1/763; F02K 1/766
See application file for complete search history.

(56) References Cited

U.S. PATENT DOCUMENTS

| | | | | |
|---|---|---|---|---|
| 3,262,268 A | * | 7/1966 | Beavers | F02K 1/72 239/265.19 |
| 3,347,467 A | * | 10/1967 | Anton | F02K 1/04 239/265.13 |
| 3,638,250 A | * | 2/1972 | Johnson | A47C 20/022 5/651 |
| 3,779,010 A | * | 12/1973 | Chamay | F02K 1/09 239/265.31 |
| 3,814,324 A | * | 6/1974 | Wanger | F02K 1/12 239/127.3 |
| 3,820,719 A | * | 6/1974 | Clark | F02K 1/66 239/265.31 |
| 3,822,023 A | * | 7/1974 | Cordel | B66F 7/0608 414/11 |
| 3,829,020 A | * | 8/1974 | Stearns | F02K 1/09 181/216 |
| 4,005,822 A | * | 2/1977 | Timms | B64C 25/423 239/265.31 |

(Continued)

*Primary Examiner* — Lorne Meade
*Assistant Examiner* — Eric Linderman
(74) *Attorney, Agent, or Firm* — Snell & Wilmer L.L.P.

(57) ABSTRACT

A cascade-variable area fan nozzle system (the "CVAFN System") is provided. The CVAFN system may comprise a cascade portion and a variable area fan nozzle ("VAFN") portion. The VAFN portion may include a VAFN panel. The cascade and VAFN panel may be integrally formed with one another. The CVAFN system may include an actuation system (e.g., a jack screw) that is configured to translate the cascade and VAFN panel forward and aft. The cascade and VAFN panel may be translated aft in response to activation of the thrust reverser and/or CVAFN system.

11 Claims, 7 Drawing Sheets

(56) References Cited

U.S. PATENT DOCUMENTS

| | | | | |
|---|---|---|---|---|
| 4,007,896 A * | 2/1977 | Reynolds, III | ............ | B64C 9/14 244/113 |
| 4,340,178 A * | 7/1982 | Lawson | ................ | F02K 1/605 239/265.31 |
| 4,922,713 A * | 5/1990 | Barbarin | ................ | F02K 1/72 239/265.31 |
| 5,228,641 A * | 7/1993 | Remlaoui | ................ | F02K 1/72 239/265.31 |
| 5,309,711 A * | 5/1994 | Matthias | ................ | F02K 1/72 239/265.29 |
| 5,655,360 A * | 8/1997 | Butler | ................ | F02K 1/72 239/265.29 |
| 5,778,659 A * | 7/1998 | Duesler | ................ | F02K 1/09 239/265.27 |
| 5,806,302 A * | 9/1998 | Cariola | ................ | F02K 1/09 239/265.29 |
| 5,996,937 A * | 12/1999 | Gonidec | ................ | F02K 1/70 239/265.17 |
| 6,079,201 A * | 6/2000 | Jean | ................ | F02K 1/70 239/265.29 |
| 6,167,694 B1 * | 1/2001 | Davies | ................ | F02K 1/763 60/226.2 |
| 6,434,927 B1 * | 8/2002 | Stretton | ................ | F02K 1/72 239/265.31 |
| 7,146,796 B2 * | 12/2006 | Lair | ................ | E05B 47/0607 239/265.25 |
| 7,264,203 B2 * | 9/2007 | Lair | ................ | F02K 1/70 244/110 B |
| 7,484,356 B1 * | 2/2009 | Lair | ................ | F02K 1/72 60/226.2 |
| 7,600,371 B2 * | 10/2009 | Sternberger | ............ | B64D 29/06 239/265.31 |
| 7,735,778 B2 * | 6/2010 | Lair | ................ | F02K 1/32 239/265.19 |
| 8,015,797 B2 * | 9/2011 | Lair | ................ | F02K 1/60 244/110 B |
| 8,091,827 B2 * | 1/2012 | Lair | ................ | F02K 1/60 244/110 B |
| 8,109,467 B2 * | 2/2012 | Murphy | ................ | F02K 1/72 244/110 B |
| 9,181,898 B2 * | 11/2015 | Bhatt | ................ | F02K 1/72 |
| 9,206,765 B2 * | 12/2015 | Vauchel | ................ | F02K 1/72 |
| 9,410,502 B2 * | 8/2016 | Vauchel | ................ | F02K 3/025 |
| 9,416,751 B2 * | 8/2016 | Jones | ................ | F02K 1/763 |
| 2004/0195434 A1 * | 10/2004 | Parham | ................ | F02K 1/62 244/11 |
| 2007/0007388 A1 * | 1/2007 | Harrison | ................ | F02K 1/766 244/110 B |
| 2007/0234707 A1 * | 10/2007 | Beardsley | ................ | F02K 1/72 60/226.2 |
| 2008/0001039 A1 * | 1/2008 | Winter | ................ | F01D 17/141 244/53 R |
| 2009/0151320 A1 * | 6/2009 | Sternberger | ............ | F02K 1/72 60/226.2 |
| 2009/0321561 A1 * | 12/2009 | Andre | ................ | F02K 1/72 244/110 B |
| 2010/0005777 A1 * | 1/2010 | Marshall | ................ | F02K 1/09 60/204 |
| 2010/0024387 A1 * | 2/2010 | Marche | ................ | F02K 1/72 60/226.2 |
| 2010/0212286 A1 * | 8/2010 | West | ................ | F02K 1/32 60/226.2 |
| 2010/0229528 A1 * | 9/2010 | Ramlaoui | ................ | F02K 1/09 60/226.2 |
| 2011/0167790 A1 * | 7/2011 | Cloft | ................ | F02K 1/68 60/226.2 |
| 2012/0079805 A1 * | 4/2012 | Stuart | ................ | F02K 3/06 60/226.2 |
| 2013/0025259 A1 * | 1/2013 | Beardsley | ................ | F02K 1/72 60/226.2 |
| 2013/0205753 A1 * | 8/2013 | Todorovic | ............ | F02K 3/025 60/226.2 |
| 2013/0284822 A1 * | 10/2013 | Howarth | ................ | F02K 1/70 239/11 |
| 2013/0312387 A1 * | 11/2013 | West | ................ | F02K 1/09 60/226.2 |
| 2014/0027537 A1 * | 1/2014 | Binks | ................ | F02K 1/09 239/265.35 |
| 2014/0110503 A1 * | 4/2014 | Teulou | ................ | B64D 33/04 239/265.19 |
| 2014/0150403 A1 * | 6/2014 | Stuart | ................ | F02K 1/72 60/204 |
| 2014/0234081 A1 * | 8/2014 | Amkraut | ................ | F02K 1/09 415/145 |
| 2015/0108249 A1 * | 4/2015 | James | ................ | F02K 1/62 239/265.19 |
| 2015/0275766 A1 * | 10/2015 | Kohlenberg | ............ | F02K 1/09 60/805 |
| 2015/0308380 A1 * | 10/2015 | Biset | ................ | F02K 1/32 60/226.2 |
| 2016/0025037 A1 * | 1/2016 | Teia Dos Santos Mendes Gomes | ................ | F02K 1/72 415/1 |
| 2016/0153399 A1 * | 6/2016 | Sawyers-Abbott | ....... | F02K 1/72 239/1 |
| 2016/0169157 A1 * | 6/2016 | Sawyers-Abbott | ....... | F02K 1/72 239/1 |
| 2016/0169158 A9 * | 6/2016 | Ramlaoui | ................ | F02K 1/763 239/265.19 |

\* cited by examiner

DUAL ACTUATION SYSTEM FOR CASCADE AND THRUST REVERSER PANEL FOR AN INTEGRAL CASCADE VARIABLE AREA FAN NOZZLE

FIELD

The present disclosure relates to a variable area fan nozzle ("VAFN"), and more specifically, to integral cascade-VAFN systems and apparatuses.

BACKGROUND

Typical VAFNs systems include a VAFN panel that is installed aft of the thrust reverser. The VAFN panel may be actuated using two actuators. Each of the actuators may be coupled to a VAFN panel and may be configured to actuate the VAFN panel forward and aft.

SUMMARY

In various embodiments, a VAFN system may comprise a cascade, a VAFN panel, and an actuation system. The VAFN panel may be coupled to the cascade. The actuation system may also be coupled to the cascade. The actuation system may be configured to translate the cascade and VAFN panel forward and aft.

In various embodiments, a nacelle may comprise a first hemisphere. The first hemisphere may comprise a torque box, a first actuation system, a translating sleeve, a cascade, a VAFN panel, and a second actuation system. The first actuation system may be coupled to the toque box. The translating sleeve may comprise an outer portion and an inner portion. The translating sleeve may be coupled to the first actuation system. The cascade may be disposed between the outer portion and the inner portion of the translating sleeve. The VAFN panel may be coupled to the cascade. The second actuation system may be coupled to torque box and the cascade. The second actuation system may be configured to translate the cascade and the VAFN panel forward and aft.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

In various embodiments, a VAFN may be configured to adjust the flow area in the aft portion and/or the exhaust of the bypass duct by translating forward and aft. In this regard, the VAFN may be configured to adjust flow from the fan through the bypass duct by controlling the exhaust area of the bypass duct.

Figure 1:
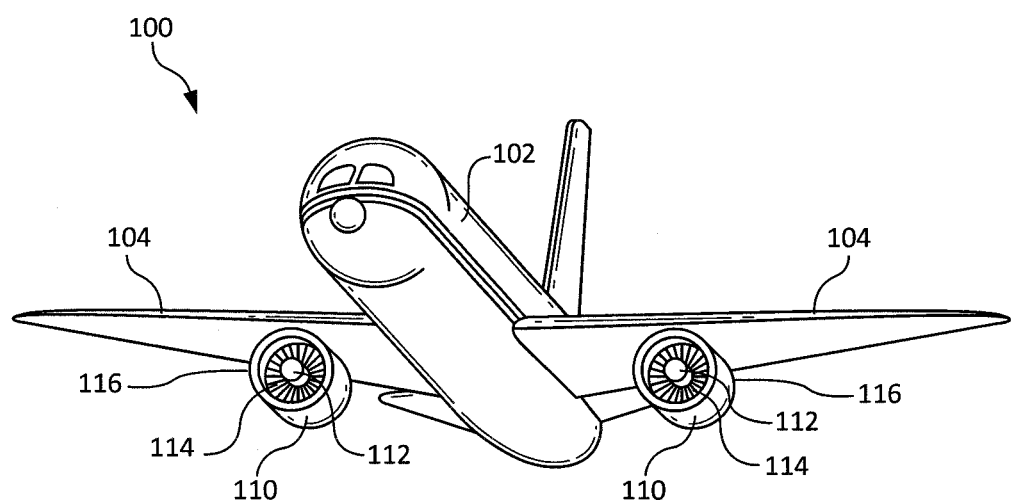
FIG. 1 illustrates a perspective view of an aircraft, in accordance with various embodiments.

In various embodiments and with reference to FIG. 1, an aircraft 100 may comprise a fuselage 102 and a pair of wings 104. A propulsion system 110 (e.g., a turbofan jet engine with a nacelle assembly) may be mounted on the underside of each wing 104. Propulsion system 110 may be configured to provide forward thrust and/or propulsion for aircraft 100. Propulsion system 110 may comprise an engine including an engine core 112 and a fan 114, a pylon, and a nacelle 116 (e.g., a nacelle assembly and/or a nacelle package).

Figure 2:
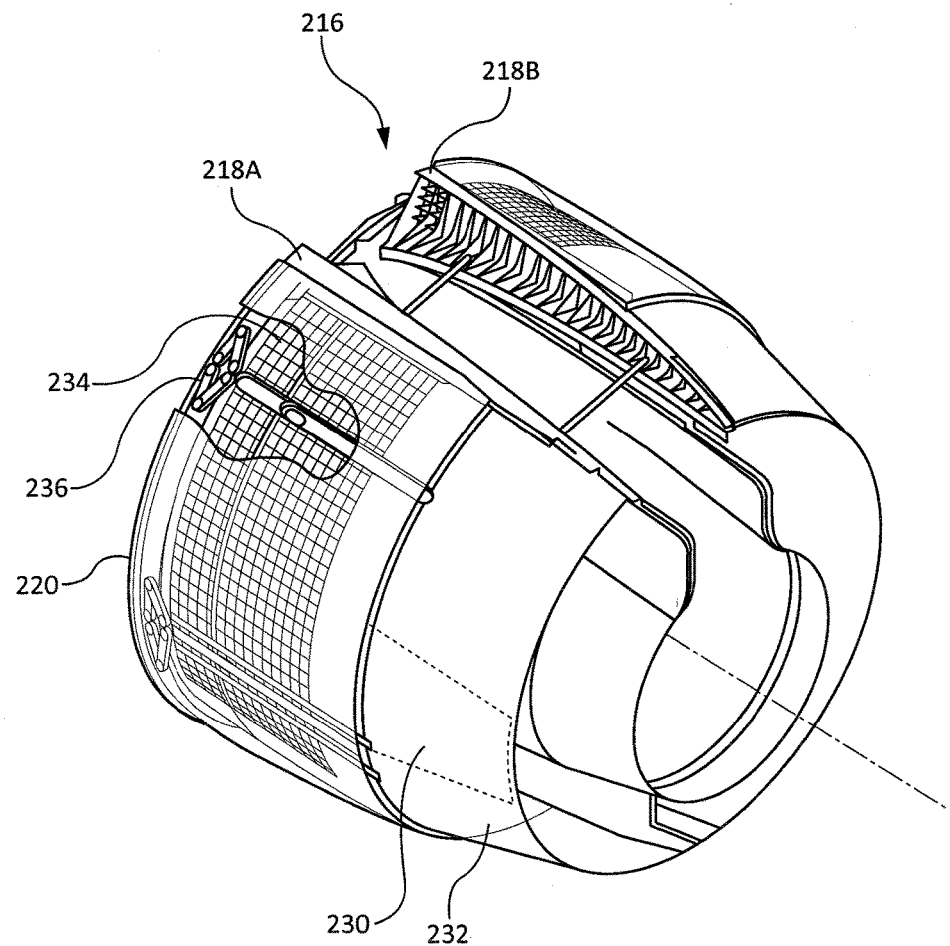
FIG. 2 illustrates a perspective view of a portion of the nacelle, in accordance with various embodiments.

In various embodiments and with reference to FIG. 2, nacelle 216 may include two hemispheres 218 (shown as a first hemisphere 218A and a second hemisphere 218B in FIG. 2). The two hemispheres may be joined together to surround the engine (e.g., the engine core 112 and fan 114 as shown in FIG. 1).

In various embodiments and with reference again to FIG. 1, fan 114 may draw and direct a flow of air into and through propulsion system 110. After fan 114, the air is divided into two principal flow paths, one flow path through engine core 112, and another flow path through a bypass air duct. The engine core flow path is directed into engine core 112 and initially passes through a compressor that increases the air flow pressure, and then through a combustor where the air is mixed with fuel and ignited. The combustion of the fuel and air mixture causes a series of turbine blades at the rear of engine core 112 to rotate, and to drive the engine's rotor and fan.

In various embodiments, the bypass air may exit the bypass air duct at the aft end of the nacelle for thrust. In turbofan engines, the bypass flow typically provides a large percentage of the thrust for an aircraft. Moreover, the exhaust area of the bypass duct is generally sized for cruise conditions to provide the maximum operating efficiency. In this regard, the engine core 112 will likely spend the majority of its operating time in cruise conditions in most operating scenarios. However, a VAFN system may increase the overall efficiency of the aircraft by creating an adjustable bypass duct exhaust area to increase the operating efficiency of the engine in non-cruise operating scenarios (e.g., take-off, climb, and descent).

In various embodiments and with reference to FIG. 2, each hemisphere 218 of nacelle 216 may comprise a fan cowl and a thrust reverser system. The fan cowl may be configured to surround the fan and define a portion of the outer surface of the bypass duct. The thrust reverser system may comprise a translating sleeve 220 and a cascade 234 (e.g., a cascade array). Translating sleeve 220 may be capable of being actuated forward and aft in response to activation of the thrust reverser system and/or a landing event. In this regard, translating sleeve 220 may be configured to translate from its stowed position to a deployed position to expose a thrust reverser system components, including, for example, cascade 234 (e.g., a cascade array, a cascade assembly, and/or the like) when the thrust reverser system is activated.

In various embodiments, each hemisphere may further comprise a cascade-variable area fan nozzle ("CVAFN") system 230. CVAFN system 230 may comprise a VAFN panel 232 and cascade 234. VAFN panel 232 may be operatively coupled to cascade 234. Moreover, cascade 234 may be integrally formed in and/or on VAFN panel 232. CVAFN system 230 may be configured to actuate aft to adjust, enlarge, control and/or otherwise modify the exhaust flow area of the bypass duct.

Figure 3A:
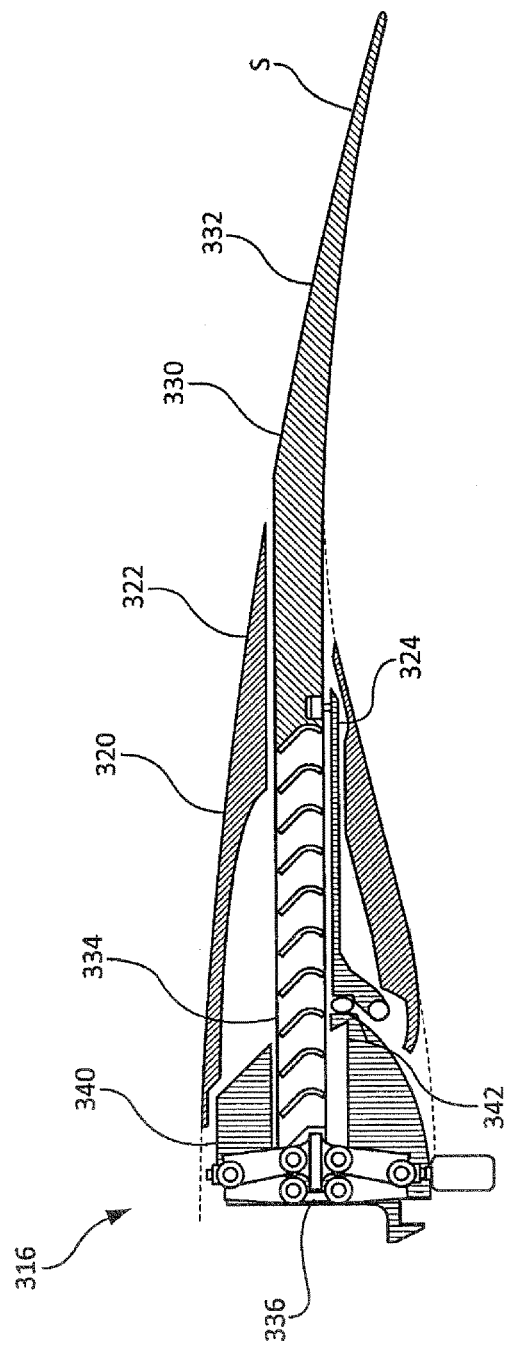
FIG. 3A illustrates a cross-sectional schematic view of a cascade-VAFN system in a cruise configuration, in accordance with various embodiments.

In various embodiments and with reference to FIG. 3A, translating sleeve 320 of nacelle 316 may comprise an outer portion 322 (e.g., a first portion, an outer translating sleeve, and/or the like) and an inner portion 324 (e.g., a second portion, an inner translating sleeve, and/or the like). Outer portion 322 and inner portion 324 may define a channel and/or space. Cascade 334 and/or VAFN panel 332 may be disposed within the space defined by and/or between outer portion 322 and inner portion 324. Each of outer portion 322 and inner portion 324 may be configured to translate forward and aft. Outer portion 322 and inner portion 324 may be separately translatable (e.g., move independently from one another). Outer portion 322 and inner portion 324 may be configured to support synchronized movement. Moreover, outer portion 322 and inner portion 324 may be coupled together in any suitable fashion. For example, outer portion 322 and inner portion 324 may be coupled together by a structure that passes through and/or around cascade 334.

In various embodiments, nacelle 316 may further comprise a torque box 340. Torque box 340 may be configured to support various nacelle components including, for example, translating sleeve 320, CVAFN system 330, one or more actuation systems (e.g., actuation system 336 and/or a translating sleeve actuation system), and/or the like. CVAFN system 330 may be coupled to and/or supported by torque box 340 via actuation system 336. In this regard, actuation system 336 (shown schematically and 90° out of plane) may couple to torque box 340 (e.g., at a first end) and CVAFN system 330 and/or cascade 334 (e.g., at a second end).

In various embodiments, actuation system 336 may be any suitable actuation system including a jack screw type actuator, a ball screw type actuator, a hydraulic actuator, and/or the like. Actuation system 336 comprises a scissor jack, which may be coupled to the forward end of cascade 334 and/or the forward end of CVAFN system 330. Moreover, actuation system 336 may be configured to translate cascade 334, VAFN panel 332, and/or CVAFN system 330 between a stowed position and a deployed position.

In various embodiments and with reference to FIG. 3A, CVAFN system 330 of nacelle 316 is shown in a position S corresponding to a stowed position. In operation this position S may occur during taxi and/or flight (e.g., aircraft cruise). In this regard, the exhaust area of nacelle 316 may be optimized for the cruise operating mode of the engine and/or aircraft. Where CVAFN system 330 is in position S, actuation system 336 may be in a stowed, compressed, and/or contracted position.

Figure 3B:
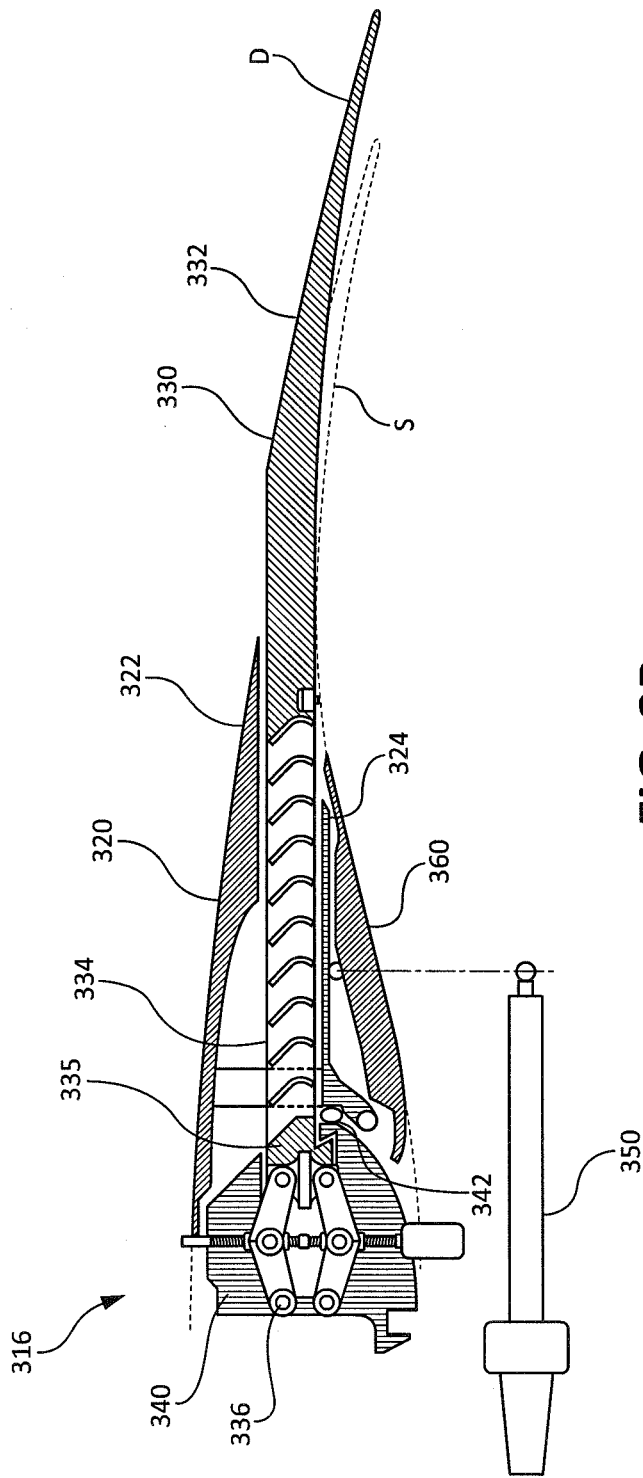
FIG. 3B illustrates a cross-sectional schematic view of a cascade-VAFN system in a VAFN configuration, in accordance with various embodiments.
Figure 4:
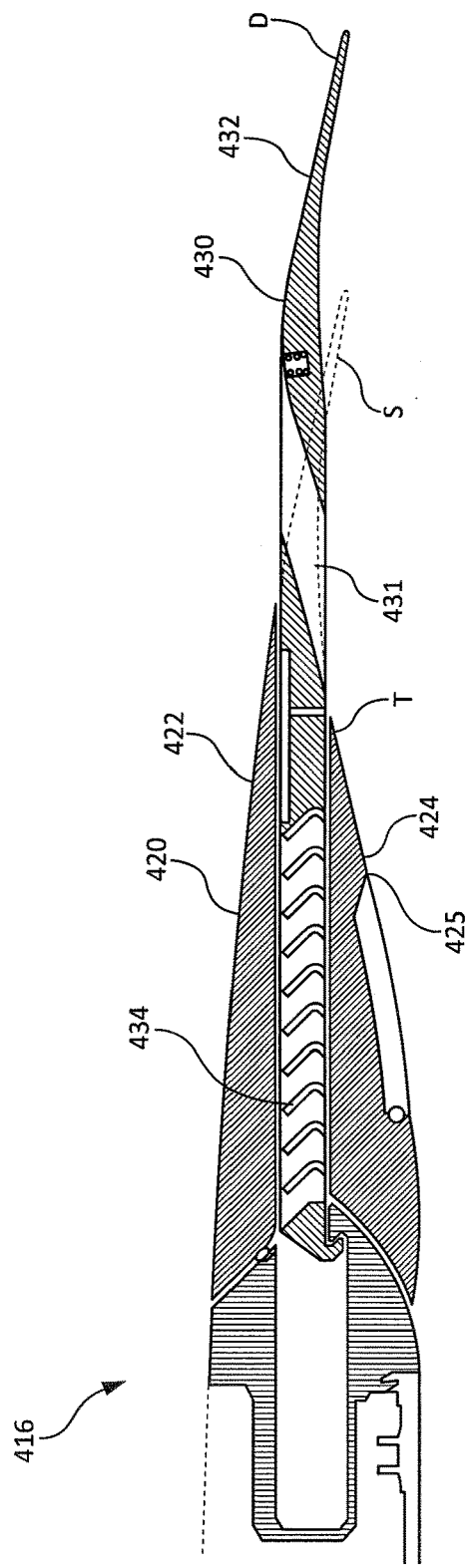
FIG. 4 illustrates a cross-sectional schematic view of a cascade-VAFN system comprising a radial exhaust port, in accordance with various embodiments.

In various embodiments and with reference to FIG. 3B and FIG. 4, nacelle 316/416 is shown in a VAFN activated configuration. In this regard, actuation system 336 may be actuated, extended, and/or translated causing cascade 334/434, VAFN panel 332/432, and/or CVAFN system 330/430 to be at a position D corresponding to a deployed position. In this configuration, translating sleeve 320/420, outer portion 322/422, and/or inner portion 324/424 may remain in a stowed position (e.g., the thrust reverser system is in a stowed configuration). Moreover, actuation system 350 (shown schematically) and blocker door system 360/460 may remain in the stowed position. In various embodiments and in the VAFN active configuration (e.g., the configuration shown in FIG. 3B), the exhaust area of nacelle 316 may be adjusted to accommodate for engine operating conditions including, for example, take-off, climb and/or descent. Moreover, CVAFN system 330 may be configured to modulate, oscillate, and/or translate forward and aft to dynamically define the exhaust area of nacelle 316 as a function of the mass flow rate of the engine, the fan speed, the pressure aft of and proximate the fan, and/or any other suitable condition. In this regard, CVAFN system 330 and/or VAFN panel 332 may be configured to increase, decrease, control, and/or modify the exhaust area of nacelle 316 and more specifically of the bypass duct of nacelle 316.

Figure 3C:
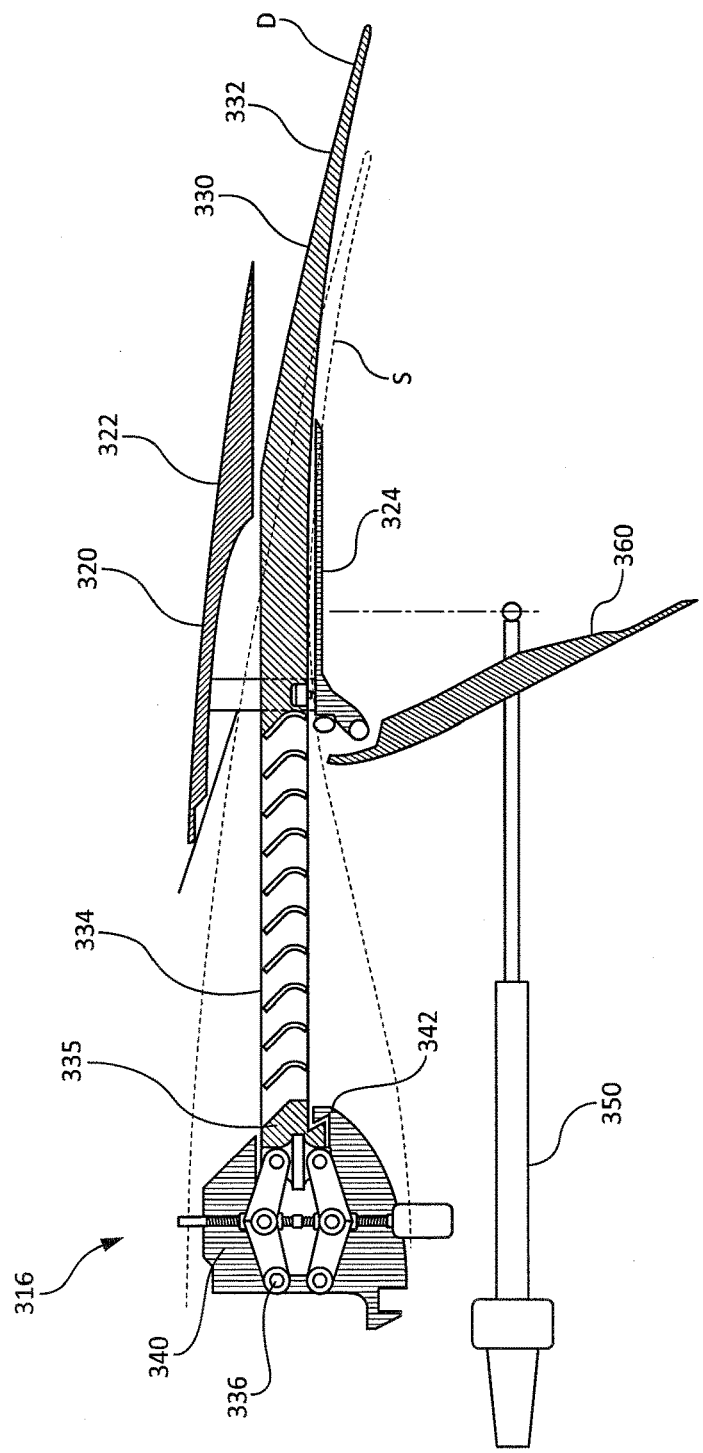
FIG. 3C illustrates a cross-sectional schematic view of a cascade-VAFN system in a thrust reverser configuration, in accordance with various embodiments.

In various embodiments and with reference to FIG. 3C, nacelle 316 is shown in a thrust reverser activated configuration. The thrust reverser may be activated in response to a touchdown of an aircraft and/or landing event. The thrust reverser may be automatically deployed or deployed in response to a command received from an operator (e.g., a pilot).

In various embodiments, actuation system 336 may be configured to deploy CVAFN system 330 and, more specifically, cascade 334 and VAFN panel 332 from the stowed position S to the deployed position D in response to thrust reverser activation. For example, cascade 334 may be translated aft to a point where cascade catch 335 meets, couples to, and/or engages torque box catch 342. In this regard, aft motion of cascade 334, VAFN panel 332 and/or CVAFN system 330 may be restrained by the engagement of cascade catch 335 and torque box catch 342. In this regard, cascade catch 335 may be engaged and further translation aft be restrained in the D position (e.g., in the full CVAFN deployed position), however, there may be cases where further travel may be reserved for other purposes and the full engagement will only occur in during thrust reverse. In other circumstances, cascade 334 may not engage cascade catch 335. In this circumstance, cascade reverser loads must be taken through the actuation system 336 and/or 350. The linkage 336 could be sized to stop motion and take loads in lieu of using the catch.

Moreover, actuation system 350 may be configured to actuate translating sleeve 320 and blocker door system 360. More specifically, actuation system 350 may be configured to translate outer portion 322 and inner portion 324 aft exposing at least a portion of cascade 334 and diverting bypass air from the bypass duct to cascade 334. Actuation system 350 comprises a jack screw. Cascade 334 may be configured to divert this flow in a forward direction to create reverse thrust for the aircraft.

In various embodiments and in operation, CVAFN system 330 may be in the deployed position during landing approach and even touchdown. In response to the landing, the thrust reverser system may be initiated causing translating sleeve 320 to translate to its deployed position. CVAFN system 330 will be in deployed position D and catch 335 may be fully engaged before thrust reverser loads are realized.

In various embodiments, CVAFN system 330 may increase the effective nozzle area by translating the fixed outside diameter of the bypass nozzle over a smaller conic diameter of the engine core cowl. The increase in area may be measured by the ring disk area difference between those core diameters. Should the slope angle of that conic be very shallow or the area increase required be much larger, the resulting translation stroke may increase.

In various embodiments and with reference to FIG. 4, nacelle 416 is shown in a CVAFN system active configuration. In this regard, CVAFN system 430, cascade 434, and/or VAFN panel 432 may be in deployed position D. Moreover, translating sleeve 420, and more specifically, outer sleeve 422 and inner sleeve 424 may be retained in a stowed position. CVAFN system 430 and/or VAFN panel 432 may comprise and/or define a port 431. Port 431 may be a channel defined through a portion of VAFN panel 432. Moreover, port 431 may be configured to exhaust air from the bypass exhaust radially outward over a portion of nacelle 416.

In various embodiments, inner sleeve 424 may define an inner flow surface 425 that defines a portion of the exhaust of the bypass duct of nacelle 416. In operation and in a deployed condition, port 431 of CVAFN system 430 and/or VAFN panel 432 may be configured to align with inner flow surface 425. In this regard, the transition point T from inner flow surface 425 to port 431 may be smooth. This transition port point may be smooth to improve aerodynamic efficiency and/or flow through nacelle 416 and/or the bypass duct. Moreover, port 431 may be sized and/or positioned in combination with the translated nozzle effects to realize a step increase to a nominal maximum VAFN flow. For example, in a climb operating mode with a high fuel burn rate, the exhaust area may be quickly increased by deploying CVAFN system 430 to position D. This position may provide an increased exhaust area through port 431 to accommodate increased engine output and resulting thrust requirements to meet climb conditions.

Figure 5:
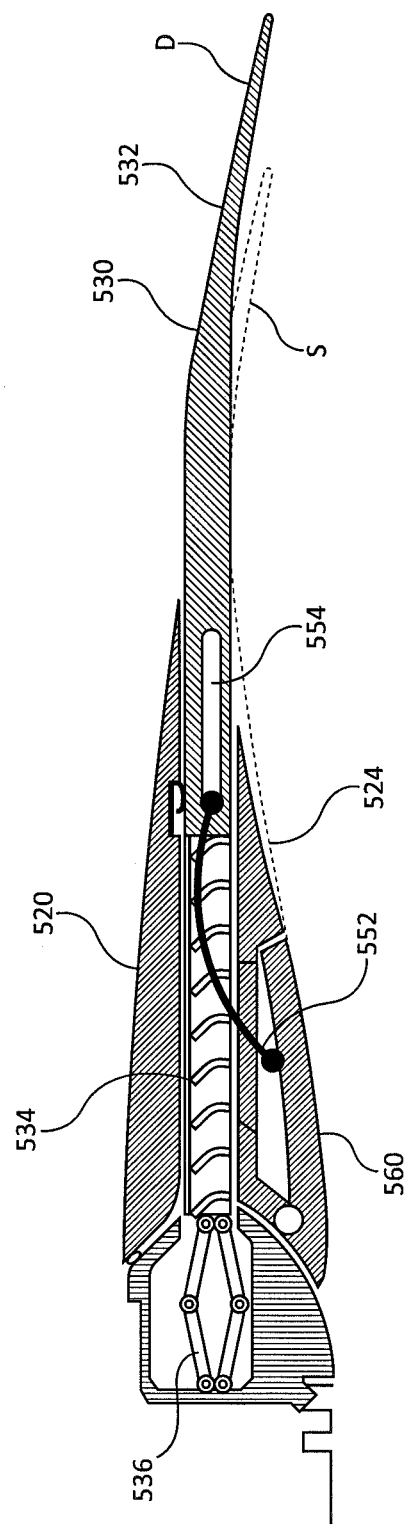
FIG. 5 illustrates a cross-sectional schematic view of a cascade-VAFN system comprising a drag link-less blocker door system, in accordance with various embodiments.

In various embodiments and with reference to FIG. 5, an exemplary CVAFN system 530 and/or VAFN panel 532 may be configured with a slot 554. This slot may be capable of and/or configured to engage a drag-linkless blocker door actuation system. Slot 554 may be configured to isolate link 552 from CVAFN system 530. Moreover, CVAFN system 530 may be translated forward and aft by actuation system 536 without affecting the position of blocker door 560, and/or translating sleeve 520. The use of a cam and slot may allow the blocker door deployment mechanism to be isolating and/or separated from CVAFN system 530. In this regard, the blocker door and CVAFN system 530 may move independently of one another. Moreover, other methods of deploying blocker doors may be implemented with the systems described herein. Those methods of deploying blocker doors may include converting relative motions between panel 532 and inner sleeve 524, to deploy blocker doors 560.

In various embodiments, the CVAFN systems, translating sleeves, cascades, VAFN panels and other structures and systems described herein may be used in any suitable nacelle structure including D-duct nacelle structures and O-duct nacelle structures. Moreover, the systems described herein may be capable of being installed in high bypass ratio geared turbo fan systems requiring variable area nozzles to accommodate the operating parameters of the engine and/or the fan. In various embodiments, the systems described herein may provide for smaller overall installation envelopes.

In various embodiments, integration of the cascade array and VAFN panel may resolve and/or reduce the space conflict between the thrust reverser, VAFN system, and their associated actuation systems. In this regard, the integration of the separate systems into a single system reduces the overall need for functional space and allowing for common actuation points from the torque box through the cascade to the VAFN panel. In various embodiments, combining the cascade and VAFN panel may allow the nacelle outer barrel and/or the VAFN panel to be shortened by the distance between cascade stowed and deployed positions. This may generally provide weight savings and increase in aerodynamic efficiency.

In various embodiments, the systems described herein may employ various seals to prevent leakage and/or flow through channels defined by the various system structures, including, for example, the inner translating sleeve and the outer translating sleeve, the CVAFN system, and the interfaces between the translating sleeve, the outer translating sleeve and the CVAFN system.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A variable area fan nozzle ("VAFN") system, comprising:
   a cascade;
   a translating sleeve circumferentially covering the cascade;
   a VAFN panel coupled to the cascade;
   a first actuation system comprising a scissor jack, the scissor jack coupled to the cascade and configured to translate the cascade, the translating sleeve and VAFN panel forward and aft;
   a second actuation system comprising a jack screw, the jack screw configured to translate the translating sleeve.

2. The VAFN system of claim 1, wherein the VAFN panel defines a port through a portion of the VAFN panel.

3. The VAFN system of claim 2, wherein the port is configured to exhaust air radially outward.

4. The VAFN system of claim 1, wherein the cascade and the VAFN panel are in a stowed position in a cruise configuration.

5. The VAFN system of claim 1, wherein the cascade and the VAFN panel are in a deployed condition in response to at least one of a thrust reverser being activated and the VAFN system being activated.

6. The VAFN system of claim 1, wherein the cascade includes a catch.

7. The VAFN system of claim 6, wherein the catch is configured to engage a torque box of a nacelle in response to at least one of a thrust reverser being activated and the VAFN system being activated.

8. A nacelle, comprising:
   a first hemisphere comprising:
      a torque box;
      a first actuation system, comprising a scissor jack, the scissor jack coupled to the torque box and configured to translate a cascade;
      a translating sleeve comprising an outer portion and an inner portion, the translating sleeve coupled to a second actuation system;
      the cascade disposed between the outer portion and the inner portion;
      a variable area fan nozzle ("VAFN") panel integrally formed to the cascade; and
      the second actuation system, comprising a jack screw, the jack screw coupled to the torque box and the translating sleeve, the second actuation system configured to translate the translating sleeve forward and aft.

9. The nacelle of claim 8, wherein the VAFN panel is configured with a radial exhaust port.

10. The nacelle of claim 9, wherein the inner portion defines a flow surface that aligns with the radial exhaust port in response to the VAFN panel being actuated aft.

11. The nacelle of claim 9, wherein the radial exhaust port is configured to cause an increase in the effective exhaust area of a bypass duct of the nacelle.

* * * * *